United States Patent [19]

Owen et al.

[11] 4,408,533
[45] Oct. 11, 1983

[54] ACOUSTIC AMPLITUDE-THRESHOLD TARGET RANGING SYSTEM

[75] Inventors: Thomas E. Owen, Helotes; Sidney A. Suhler; Wendell R. Peters, both of San Antonio, all of Tex.

[73] Assignee: The United States of America as represented by the Secretary of the Air Force, Washington, D.C.

[21] Appl. No.: 286,820

[22] Filed: Jul. 27, 1981

[51] Int. Cl.³ .............................................. F42C 13/06
[52] U.S. Cl. .................................... 102/211; 102/427
[58] Field of Search ............... 102/211, 427, 418, 419, 102/420, 215

[56] References Cited

U.S. PATENT DOCUMENTS

| | | | |
|---|---|---|---|
| 2,341,351 | 2/1944 | Barkley | 102/211 |
| 2,439,255 | 11/1949 | Barker | 102/211 |
| 3,115,833 | 12/1963 | Hall et al. | 102/418 |
| 4,135,452 | 1/1979 | Kinsey et al. | 102/214 |
| 4,189,999 | 2/1980 | Anderson | 102/418 |
| 4,207,623 | 6/1980 | Anderson | 102/418 |

*Primary Examiner*—Charles T. Jordan
*Attorney, Agent, or Firm*—Donald J. Singer; Willard R. Matthews

[57] ABSTRACT

Munition actuation signals are generated by an acoustic target ranging system that predicts the time and distance of closest approach of a moving target to a munition. The predictive capability of the system is based on the rate of change of the sound level emanating from the target compared to its absolute magnitude. The system generates munition standby, arm and fire signals by differencing the received acoustic amplitude function signal and its first derivative and subsequently comparing the difference signal with various reference level signals. The reference level signals are a function of munition effective range and target conditions. Mechanization of the system is realized by simple circuitry consisting of an acoustic signal detector and processor, a differentiating operational amplifier, a programmable gain amplifier, a reference level signal source, an adder and a comparator circuit.

6 Claims, 5 Drawing Figures

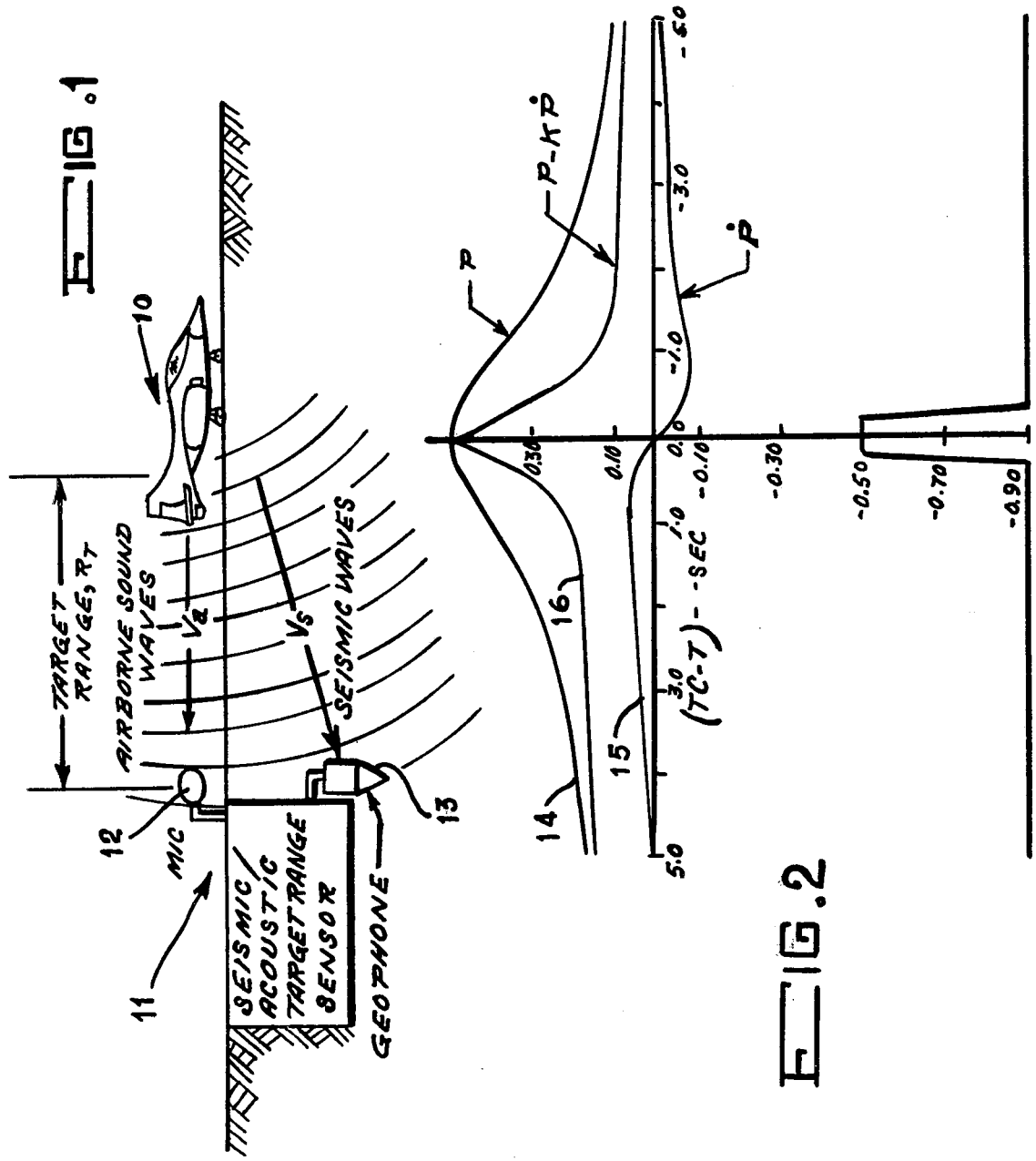

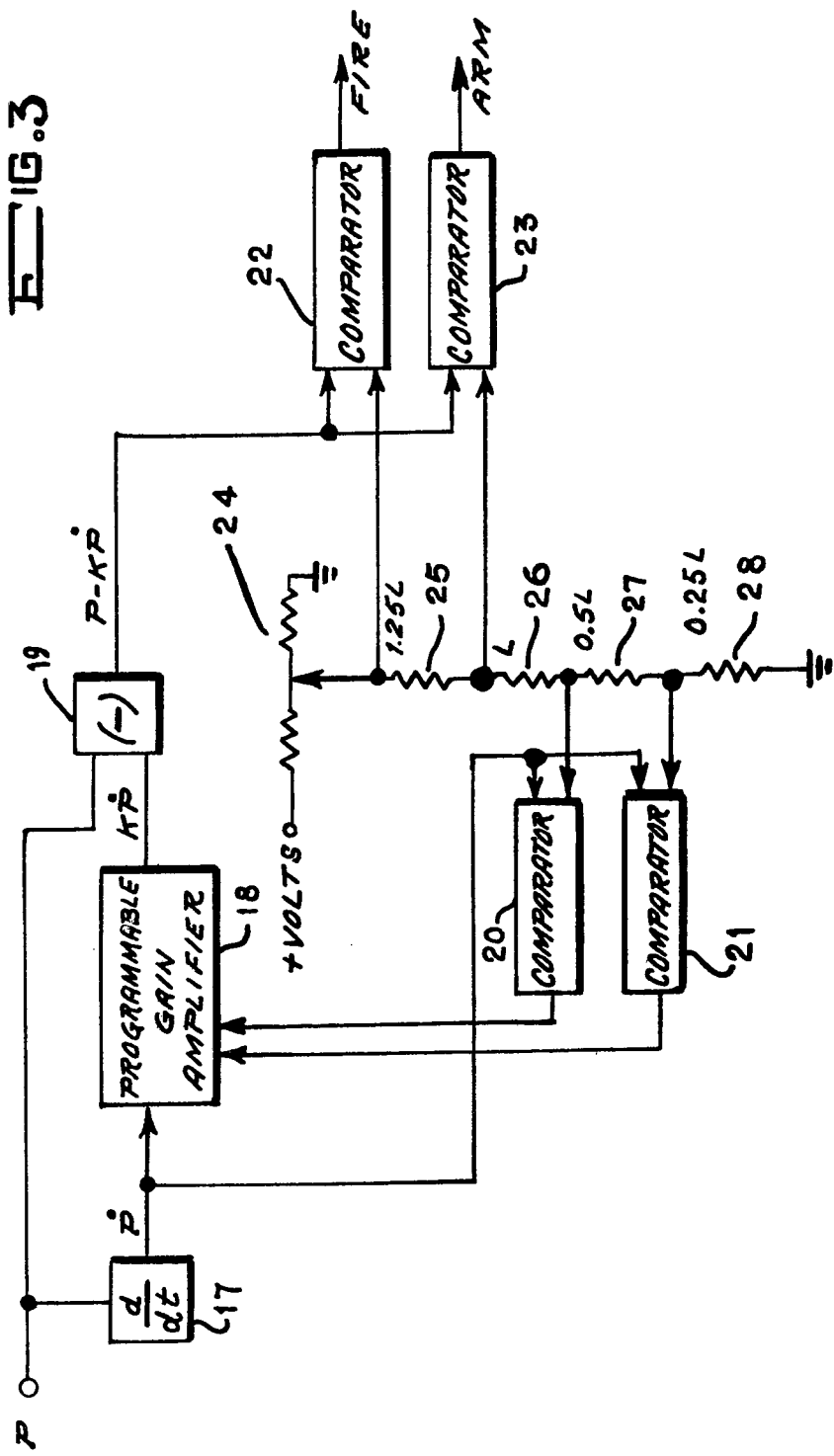

ACOUSTIC AMPLITUDE-THRESHOLD TARGET RANGING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to target ranging and target actuated munitions and in particular to an acoustic system that predicts the closest point of approach to a munition and the time of arrival thereat of a moving target and generates a munition fire signal in response thereto.

There currently exists a military requirement for a system that is capable of automatically detecting and classifying military targets and developing firing signals for special munitions at the appropriate target position and time. It is a specific requirement of such a system to detect ground based targets through their seismic, acoustic and/or other characteristic emanations and to produce an electrical firing command when the target is at its closest point of approach and within the predetermined effective range of the munition. Physical constraints on the requirement dictate that the sensor must be passive and act independently from a single point. Further, the concept of the system must be such that the sensor system can ultimately be reduced in size, power consumption and cost to be placed within the munition.

These constraints essentially eliminate the use of conventional radar devices because they are not passive and also because of their size, cost and complexity.

One prior art approach to providing the type of system required comprehends the concept of single site ranging by cross-correlation of seismic and acoustic signals. Such a concept depends upon or infers a knowledge of the velocity of propagation over two paths. The speed of sound in air is reasonably constant being mildly dependent on air temperature. If accuracy requirements dictate the need, air temperature could be sensed and the necessary corrections performed. However, obtaining a knowledge of the seismic velocity over short ranges and in the top soil and weathered layer is extremely difficult. The details of runway construction and other man-made changes in the natural terrain as well as naturally occurring rapid changes in said conditions from point to point on the surface make the advance prediction of seismic velocity impractical. Systems of the type therefore have never been effectively developed.

Another approach utilizing the concept of single site ranging by an acoustic single sensor method has been developed and is decribed in our co-pending patent application Ser. No. 286,819, entitled *Acoustic Amplitude-Doppler Target Ranging System,* filed on even date herewith. Although this system generally satisfies the above-stated requirements, it is relatively complex and may not be applicable in situations calling for small electronically simple systems.

Accordingly, there currently exists the need for a target ranging system for munition activation that is passive and acts independently from a single point and that is small, inexpensive and low in power consumption. It is also required that such a system be electronically simple and highly reliable. The present invention is directed toward satisfying that need.

SUMMARY OF THE INVENTION

The invention is an acoustic target ranging system that predicts, from sound or seismic waves emanating from a moving target, the time and distance of closest approach of the target to a munition. The system generates munition actuating signals based on the predicted time of arrival of the target and the effective range of the munition.

The system is implemented by means of a relatively simple electronic circuit. An acoustic or seismic detecting circuit detects sound or seismic vibrations emanating from the target and develops an amplitude function signal. A differentiating operational amplifier differentiates the amplitude function signal to provide a first derivative signal. The first derivative signal is subtracted from the amplitude function signal by an adder and the resultant signal is compared by three comparators with threshold level signals that are developed by a voltage divider. The comparators generate a standby, an arm and a fire signal depending upon the target munition physical relationship as indcted by the compared values. Improved performance is achieved by utilizing a programmable gain amplifier to vary the gain of the derivative signal.

It is a principal object of the invention to provide a new and improved acoustic amplitude-threshold target ranging system.

It is another object of the invention to provide an acoustic amplitude-threshold target ranging system including a munition and means for firing the munition at the time and point of closest approach of the target.

It is another object of the invention to provide an acoustic amplitude-threshold target ranging system that is passive and acts independently from a single point.

It is another object of the invention to provide an acoustic amplitude-threshold target ranging system that is small, inexpensive and low in power consumption.

It is another object of the invention to provide an acoustic amplitude-threshold target ranging system that is electronically simple and highly reliable.

These, together with other objects, features and advantages of the invention will become more readily apparent from the following detailed description taken in conjunction with the illustrative embodiment in the accompanying drawings.

DESCRIPTION OF THE DRAWINGS

FIG. 1 is a pictorial representation of an application of the target ranging system of the invention;

FIG. 2 is a graph of an acoustic signal amplitude function, its derivative and difference function;

FIG. 3 is a simplified block diagram of the system of the invention;

DETAILED DESCRIPTION OF THE PREFERRED EMBODIMENT

Figure 4:
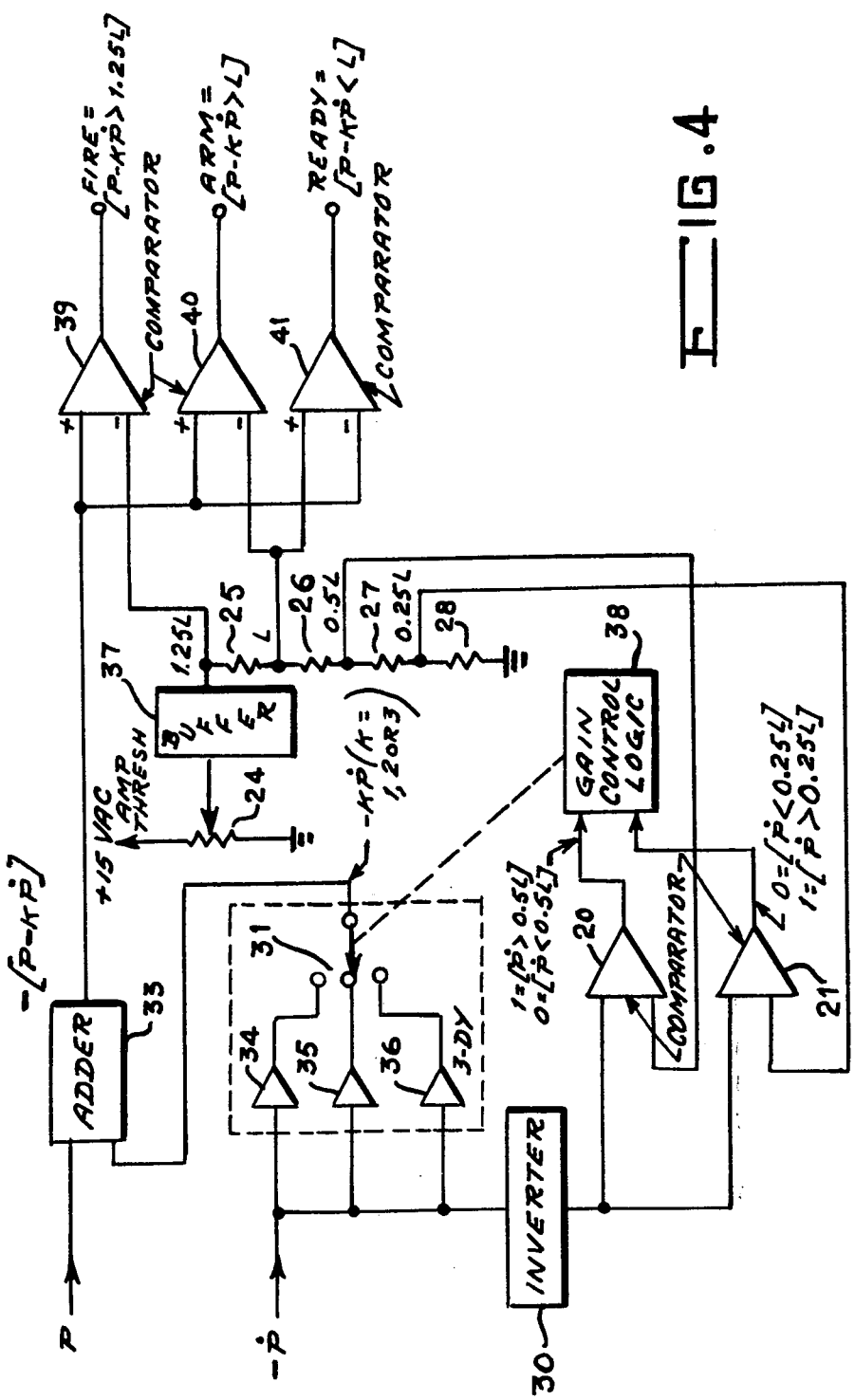
FIG. 4 is a detailed block diagram of the system of the invention.

The detection and ranging function of the system of the invention is to detect passing aircraft targets that are taxiing or taking off and to provide a munition firing signal at the closest point of approach of the target within a specified range. The concept upon which the system is based comprehends a single acoustic (or seismic) sensor that extracts the required information from the target signal amplitude and frequency content.

FIG. 1 is a pictorial illustration of an aircraft 10 (target) and sensing system 11 including microphone 12 and geophone 13 in the type of relationship described.

The system of the invention is implemented by a simple electronic circuit that predicts the time and distance to closest approach of a moving target to a munition. The system makes its predictions based upon the rate of change of the sound levels emanating from the target as compared to its absolute magnitude.

The operating principles of the invention have been developed by considering that in a basic sense, the loudness of a sound indicates the relative position of the source. Although the intensity of the source tends to confuse this simple listening concept, a human observer unconciously detects other features in the sound such as the type of source indicating the anticipated sound level, doppler shift indicating an approaching, or receding of the source, and the rate of change of the sound level. As mentioned above, this last feature, the rate of change of the sound level compared to its absolute magnitude, is a good indicator of the approximate range and the time of closest approach and is fundamental to the invention.

The development of the Acoustic Amplitude Threshold method approach comprehended by the invention has resulted from empirically attempting to deduce from the shape of the amplitude function (P) and its first derivative ($\dot{P}$) the time of closest approach within some predetermined range limit.

Curves 14, 15 and 16 of FIG. 2 respectively illustrate plots of amplitude function P, first derivative function $\dot{P}$ and the difference function $P - K\dot{P}$.

It is noted that the sharpness of the peak of the $P - K\dot{P}$ function is greater than the P function itself. This can be further enhanced if K is allowed to assume a decreasing value as the amplitude of $\dot{P}$ increases.

A method of controlling the value if K that has proved to be effective is to allow K to assume three values according to the absolute amplitude of $\dot{P}$. In developing this technique an acoustic signal absolute reference level (L) was assumed. The absolute value of P was compared with L, and the value of K was determined by the conditions shown below.

$$K = 3; \ |\dot{P}(t)| \leq 0.25 \ L \quad (1)$$

$$K = 2; \ 0.25 \ L < |\dot{P}(t)| \leq 0.5 \ L \quad (2)$$

$$K = 1; \ 0.5 \ L < \dot{P}(t) \quad (3)$$

The munition status is determined by comparing $P - K\dot{P}$ with the value of L determined in field experiments to best suit the various target situations and the effective range of the munition. The output signals from the implemented hardware in the example given would be:

Munition Standby if $P(t) - K|\dot{P}(t)| < L$ (4)

Munition Arm if $P(t) - K|\dot{P}(t)| > L$ (5)

Munition Fire if $P(t) - K|\dot{P}(t)| > 1.25 \ L$ (6)

This concept has been tested for a wide range of parameters for taxiing, taking off, and fly-over aircraft.

The range of parameter values used in the model are given below:

| Taxiing and Take-off Aircraft |
| --- |
| d = 30, 45, 60, 75, 90 meters |
| a = 0 m/sec$_2$   a = 3 m/sec$^2$   a = 5 m/sec$^2$ |
| $v_c$ = 10 m/sec   $v_c$ = 30 m/sec   $v_c$ = 45 m/sec |
| Fly-Over Aircraft |
| d = 30, 45, 60, 75, 90 meters |
| a = 0 m/sec$^2$ |
| $v_c$ = 45, 90, 135, 180 m/sec | where:
d is the closest approach distance;
a is aircraft acceleration and
$v_c$ is closest approach velocity.

The implementation of the amplitude threshold method of the invention is a mechanization of equations 4, 5 and 6. FIG. 3 is a simplified block diagram of the concept. The circuit shown thereby comprises differentiating operational amplifier 17, programmable gain amplifier 18, comparators 20, 21, 22, 23 differencing means 19, and a threshold level signal source consisting of potentiometer 24 and resistors 25, 26, 27, 28. The function P is derived from the acoustic signal as hereinafter described with reference to FIG. 5. The function $\dot{P}$ is derived from P by means of operational amplifier 17. The value of K is determined by the instantaneous value of $\dot{P}$ compared to two fixed voltages proportional to the maximum target range. The programmable gain amplifier 18 produces a gain of 3 (K=3) if $\dot{P}(t)$ is less than 0.25 L [Equation (1)]; a gain of 2 (K=2) if $\dot{P}(t)$ is less than 0.5 L but greater than 0.25 K [Equation (2)]; and a gain of 1 (K=1) if $\dot{P}(t)$ is greater than 0.5 L [Equation (3)]. A subtractor circuit 19 yields $P - K\dot{P}$ which is then compared with L and 1.25 L. When P−1 rises above L, the system is armed, and when it exceeds 1.25 L a firing signal is produced. If P−KP is less than 1, the system is in the standby mode.

FIG. 4 shows a more detailed block diagram of the circuitry of the invention. Referring to FIG. 4, it is seen that the circuit also includes inverter 30, adder 33, amplifiers 34, 35, 36, buffer 37, gain control logic 38, switch 31 and output signal comparators 39, 40, 41. The inputs to this section are the P and $-\dot{P}$ signals as noted above. In operation, the $-\dot{P}$ signal is inverted by inverter 30 before being coupled to two comparators 20, 21. One of these comparators 20 goes high (logic 1) when the $\dot{P}$ signal is greater than 0.5 L, where L is a threshold value determined by the "Threshold" control (not shown). A second comparator 21 goes high when $\dot{P}$ is greater than 0.25 L. The state of these two comparators is used to control the gain of the $-\dot{P}$ signal before it is added to the P signal by adder 33. The result is an analog signal given by $P - K\dot{P}$ where K=1, 2, or 3 is the $-\dot{P}$ signal gain depending upon the amplitude of the $\dot{P}$ signal. When $P - K\dot{P}$ is less than L, the fire control circuit is in the "STANDBY MODE". The "ARM" condition is reached when $P - K\dot{P}$ is greater than L. The "FIRE" signal is generated when $P - K\dot{P}$ is greater than 1.25 L.

Figure 5:
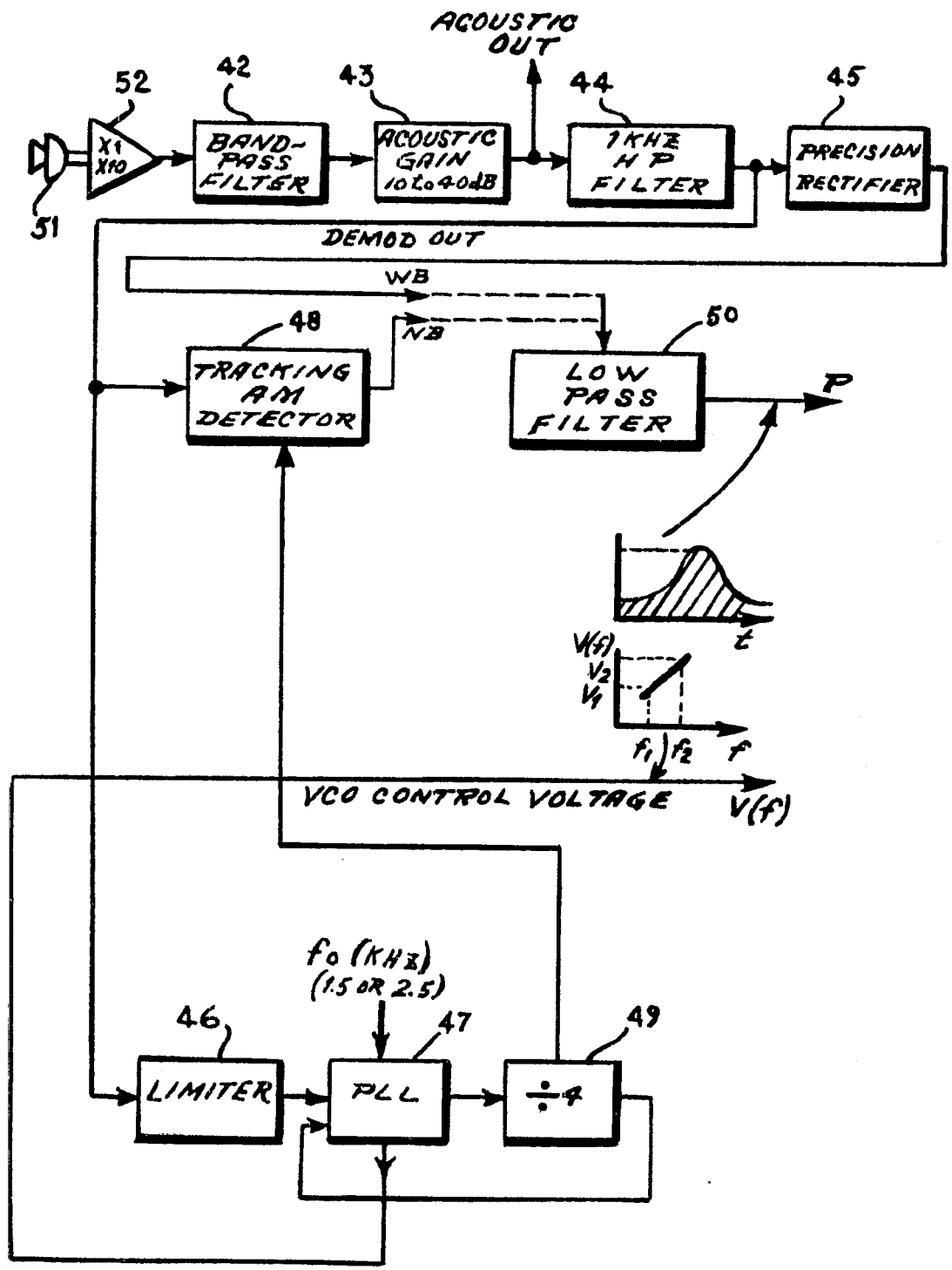
FIG. 5 is a block diagram of the preamplifier and signal conditioning circuits of the invention.

FIG. 5 shows the signal conditioning sections of the system. It comprises microphone 51, preamplifier 52, bandpass filter 42, acoustic gain stage 43, high pass filter 44, rectifier 45, limiter 46, phase locked loop circuit 47, tracking AM detector 48, divider 49, and low pass filter 50. By way of example, microphone 51 can be a 1 inch-diameter ceramic microphone (GenRad Model 1560-2131), which is connected to a variable gain preamplifier 52 (GenRad Model 1560-P40), and the two together constitute the transducer element used to sense the acoustic target signal.

A ceramic microphone is preferably used because of its ruggedness, stability, and reliability. Its relatively low impedance results in low preamplifier noise, high sensitivity, and it operates well under conditions of high humidity.

The microphone can be mounted vertically to give a grazing incidence response to the acoustic signals from the aircraft. For this configuration, the direction of sound propagation is parallel to the plane of the microphone diaphragm. Thus, the sound wave can approach the microphone from any side giving a uniform omnidirectional response in the horizontal direction.

The microphone can also be fitted with a commercial windscreen to reduce the effects of ambient wind noise. Wind turbulence at the surface of the microphone diaphragm generates low frequency noise, which can lead to erroneous measurement. The windscreen also protects the microphone from accumulations of vapor and dust. The effect of the windscreen on the frequencies of interest is almost negligible. The screen does attenuate the higher frequencies, however, with a loss of about 1 dB at 8 MHz and increasing at higher frequencies.

The wideband signal from the microphone preamplifier is band-limited by external variable bandpass filter 42 and the output of the bandpass filter is coupled to the input of internal variable gain amplifier 43.

A 1-KHz highpass filter 44 follows the acoustic gain amplifier 43. This filter for example can be a 4-pole Butterworth type giving a filter rolloff skirt of 24 dB per octave.

The filtered acoustic signal is coupled to the inputs of two types of amplitude demodulators. One amplitude detector with the notation "WB" (wide-band) is an absolute value circuit consisting of precision fullwave amplifier 45.

The "NB" (narrowband) amplitude demodulator uses a phase locked loop 47 (PLL) to lock onto the dominant coherent spectral component within the capture range of the PLL. The PLL operates on zero crossings of the acoustic signal and needs a fast rise time on its input signal. The limiter 46 between the 1 kHz highpass filter 44 and the PLL input conditions the acoustic signal for proper PLL input.

The PLL has two selectable tracking range positions of 1.5 KHz and 2.5 KHz. The 1.5 kHz position has a capture range of 1 to 2 kHz and 2.5–kHz position, a capture range of 2 to 3 kHz. The VCO in the PLL operates at a frequency which is four times the lock frequency. The VCO output is fed back to the PLL phase comparator through a divide-by-four circuit 49 which also provides the quadrature signals needed for synchronous AM demodulation. In this operation, the PLL locks onto a spectral component in the acoustic signal and produces at the divide-by-four output, a reference signal which is the same frequency as the spectral component but without amplitude modulation. This reference is multiplied (mixed) with the acoustic signal in the clock 48 labeled "Tracking AM Detector."

The outputs of either the WB or NB signal are filtered by an external low-pass filter 50 to remove high-frequency components, leaving the demodulated envelope of the "P" acoustic signal. The low-pass filter provides an attenuation slope of 24 dB/octave.

The VCO control voltage of the PLL is filtered to give a slowly varying DC voltage "v(f)" which is proportional to the lock frequency of the PLL. This signal along with the P signal are the fundamental signals used in all of the circuits of the system of the invention.

While the invention has been described in one presently preferred embodiment, it is understood that the words which have been used are words of description rather than words of limitation and that changes within the purview of the appended claims may be made without departing from the scope and spirit of the invention in its broader aspects.

We claim:

1. An acoustic amplitude-threshold system for generating munition actuation signals responsive to the time of closest approach of a moving target to within a set range limit of a munition, said acoustic-amplitude threshold system comprising:
   an acoustic sensor circuit for sensing moving target sound waves and generating an amplitude function signal P in response thereto,
   differentiating means receiving said amplitude function signal P and developing a first derivative signal $\dot{P}$ therefrom,
   amplifier means having an amplification factor K for amplifying said first derivative signal $\dot{P}$, said amplifier means providing an amplified first derivitive signal $K\dot{P}$,
   differencing means differencing said amplitude function signal P and said amplified first derivative signal $K\dot{P}$ and providing a difference signal $P - K\dot{P}$,
   a threshold circuit providing reference level signals L, and
   comparator means comparing said difference signal $P - K\dot{P}$ and said reference level signals L and generating munition actuation signals therefrom.

2. An acoustic amplitude-threshold system as defined in claim 1 wherein said comparator means generates: a munition standby signal in response to the condition $P - K|\dot{P}| < L$; a munition arm signal in response to the condition $P - K|\dot{P}| > L$; and a munition fire signal in response to the condition $P - K|\dot{P}| > 1.25\ L$.

3. An acoustic amplitude-threshold system as defined in claim 2 wherein said amplifier means is a programmable gain amplifier and the amplification factor K thereof is programmed to decrease in response to increases in the amplitude of said first derivative signal $\dot{P}$.

4. An acoustic amplitude-threshold system as defined in claim 3 wherein the amplification factor K is programmed as: $K = 3$ for the condition $|\dot{P}(t)| \leq 0.25\ L$; $K = 2$ for the condition $0.25\ L < |\dot{P}(t)| \leq 0.5\ L$; and $K = 1$ for the condition $0.5\ L < \dot{P}(t)$.

5. An acoustic amplitude-threshold system as defined in claim 3 wherein said threshold circuit comprises a voltage source and first, second, third and fourth resistors, said resistors being connected in series between said voltage source and ground, said fourth resistor being connected to ground, said resistors having resistance values that effect a reference level signal of 1.25 L between said first resistor and said voltage source, a reference level signal of L between said first and second resistors, a reference level signal of 0.5 L between said second and third resistors and a reference level signal of 0.25 L between said third and fourth resistors.

6. An acoustic amplitude-threshold system as defined in claim 5 wherein said differentiating means comprises a differentiating operational amplifier, said differencing means comprises an adder having first and second inputs and an output, said first input receiving said amplitude function P, said programmable gain amplifier comprising a first amplifier having an amplification factor $K=3$, a second amplifier having an amplification factor $K=2$, and a third amplifier having an amplification factor $K=1$, each of said amplifier receiving the first derivation signal $\dot{P}$ as an input, an inverter receiving the first derivation signal $\dot{P}$ as an input, first and second comparators having two inputs and an output, said first comparator having one input connected to receive the output of said inverter and its other input connected to receive reference level signal 0.5 L, said second comparator having one input connected to receive the output of said inverter and its other input connected to receive reference level signal 0.25 L, a gain control logic circuit receiving the outputs of said first and second comparators, a switch means for switching the output of a selected one of said first, second and third amplifiers to the second input of said adder means in response to the output of said gain control logic circuit, and said comparator means comprises third, fourth and fifth comparators each having first and second inputs and an output, said third comparator having its first input connected to receive the output of said adder and its second input connected to receive reference level 1.25 L and outputting a munition fire signal, said fourth comparator having its first input connected to receive the output of said adder and its second input connected to receive reference level signal L and outputting a munition arm signal, and said fifth comparator having its second input connected to receive the output of said adder and its first input connected to receive reference level signal L and outputting a munition ready signal.

* * * * *